Patented Sept. 21, 1943

2,330,137

UNITED STATES PATENT OFFICE

2,330,137

RECOVERY OF MAGNESIUM FROM FLUXES

William Clifford Newhams, Midland, Mich., assignor to The Dow Chemical Company, Midland, Mich., a corporation of Michigan No Drawing. Application July 2, 1942, Serial No. 449,513

3 Claims. (Cl. 75—67)

This invention relates to a method of recovering magnesium and magnesium-base alloys from dispersions thereof in alkali- and alkaline earth-metal halide fluxes.

As is well known, various metallurgical operations involving magnesium are usually carried out while the metal is at least partly immersed in a bath of a protective flux essentially comprising alkali- and alkaline earth-metal halides. During these operations, the flux tends to absorb impurities and any magnesium oxide present in the system, and a portion of the flux, together with most of the impurities and oxide, eventually settles to the bottom of the container as a more or less separate sludge-like layer, termed "spent flux," which is withdrawn from time to time as fresh flux is added. The spent flux or sludge, on removal, almost invariably has entrapped in it a small proportion of the magnesium or magnesium-base alloy being treated, usually in the form of a dispersion of discrete fine globules of metal, which cannot readily be coalesced to a reguline mass, despite the fact that the metal usually has a density slightly lower than that of the flux. Efforts have been made to recover this dispersed metal, as by casting the flux into blocks, crushing, and then screening or leaching with water, but considerable difficulty has been encountered because of the fineness of the metal particles, and the metal has for the most part been entirely lost to use.

An object of the present invention is to provide a simple and effective method for successfully recovering magnesium and magnesium-base alloys from dispersions thereof as discrete fine particles in spent fluxes and like mixtures essentially comprising alkali- and alkaline earth-metal halides.

The spent flux to be treated is ordinarily derived from the "sludging" of pots used in the formation of magnesium-base alloys by the addition of alloying elements to molten magnesium, in the melting of magnesium and magnesium-base alloy ingots prior to founding, or in the recovery of magnesium and magnesium-base alloys from scrap. However, similar spent fluxes are sometimes also withdrawn from electrolytic cells for the production of metallic magnesium. Such spent fluxes ordinarily have a melting point substantially below that of the metal contained therein, and consist, in addition to the dispersed metal, of mixtures of alkali- and alkaline earth-metal halides, most commonly mixtures of magnesium chloride with sodium chloride or potassium chloride, together with an appreciable proportion of magnesium oxide and small quantities of impurities. The metal to be recovered is usually dispersed uniformly throughout the flux in the form of discrete fine globules, some of which have a diameter as low as 0.01 inch. Such metal usually represents from 3 to 30 per cent by weight of the flux.

According to the invention, recovery of the dispersed metal from spent flux and like alkali- and alkaline earth-metal halide mixtures is carried out while both metal and flux are molten, by dividing the metal-containing flux into a plurality of small portions, and bringing such portions individually into contact with a relatively large pool or like body of molten magnesium or magnesium-base alloy. During such contact, the dispersed metal in the individual flux portions becomes coalesced, at least in part, with the metal of the pool, probably because of the washing action of the latter on the moving portions of spent flux. At the same time, the spent flux, freed of metal, being of density greater than the metal, sinks beneath the body of treating metal as a distinct layer. The metal of the original pool, augmented by that coalesced and recovered from the spent flux, may then be separated from the underlying spent flux, the latter being discarded. A part of this separated metal may then be re-used for subsequent spent flux treatments, and the remainder, representing metal recovered from the flux, is in form suitable for use.

In practicing the invention, the spent flux, which is ordinarily received in solidified form, although it may be liquid if the recovery process of the invention is carried out at a point near that where the sludge is produced, is charged to a suitable container and heated to a temperature above its melting point and above the melting point of the metal to be recovered, usually to at least 1250° F. At the same time, a quantity of magnesium or magnesium-base alloy is charged into a suitable container and melted, usually with a small proportion of fresh protective flux, to form a pool of considerable cross-sectional area, the metal being advantageously heated to a temperature of 1200° to 1400° F. The molten spent flux is then introduced into the pool of metal in individual small portions so as to afford intimate contact between the added spent flux and the metal of the pool, thereby recovering the metal from the flux, as explained.

Introduction of the molten spent flux into contact with the metal pool in small proportions may be accomplished in any desired manner, as by ladling it a little at a time. In the preferred embodiment of the invention, however, the spent flux is introduced by projecting it in the form of a plurality of fine streams onto the surface of the pool, most conveniently by pouring the flux slowly through a screen, sieve, or perforated plate disposed above the pool. By thus subdividing the flux into streams, a very effective scrubbing is achieved, and maximum recovery of the metal dispersed in the flux is obtained.

The relative quantities of the spent flux to be treated and the magnesium or magnesium-alloy constituting the pool are not critical, although the pool should, of course, be of sufficient size to permit effective scrubbing of the flux streams. In general, a pool of 50 pounds of metal suffices to recover the dispersed metal from 150 to 200 pounds of spent flux, the metal of the pool being preferably disposed so as to present a cross-sectional area large in relation to the total cross-sectional area of the streams of flux and to have a depth of at least 4 inches. The individual streams of spent flux impinging on the metal pool should be relatively fine, say from 0.06 to 0.5 inch in diameter, to insure optimum recovery of dispersed metal. This size stream is advantageously produced by a 4 to 20 mesh wire screen.

Following the washing of the spent flux with the metal pool, the volume of the latter is, of course, increased by the amount of metal extracted from the flux. The entire pool may then be withdrawn and used, or a part of the pool may be ladled off, such metal being in usable form, and the remainder of the pool left for re-use in subsequent flux treatments. At the same time, the underlying metal-freed spent flux layer may be withdrawn and discarded.

The following example will serve to illustrate the invention, but is not to be construed as limiting its scope.

*Example*

The spent flux to be recovered was derived from "sludging" a melting pot used in the manufacture of a magnesium-base alloy by the addition of alloying elements to metallic magnesium. The spent flux had approximately the following composition in per cent by weight:

| | |
|---|---|
| Potassium chloride | 45 |
| Magnesium chloride | 20 |
| Magnesium oxide | 15 |
| Magnesium alloy | 20 | the magnesium-base alloy being dispersed throughout as fine globules having a diameter of roughly 0.5 inch. A 100 pound quantity of this spent flux was charged into a suitable melting pot and heated to a temperature of 1300° F. At the same time, a charge of 30 pounds of electrolytic magnesium was melted in a separate pot and heated to a temperature of 1400° F., the pot being of such dimensions that the metal pool thus formed had a surface area of about 80 square inches and a depth of 6 inches. A 4 mesh circular steel wire screen 8 inches in diameter was then placed above the metal pool, and the molten spent flux poured slowly through the screen into the pool during 5 minutes, the screen being agitated to assist in passage of the flux. When the spent flux had all been added, the metal pool, augmented by the metal recovered from the flux, was ladled off and cast into ingots. A total of 45 pounds of metal was so obtained, representing a recovery from the flux of 15 pounds of metal.

Other modes of applying the principle of the invention may be employed instead of those explained, change being made as regards the details described, provided the step or steps recited in any of the following claims or equivalent thereof be employed.

I claim:

1. In a method of recovering molten magnesium or magnesium-base alloy from a dispersion thereof in the form of discrete fine globules in a molten metallurgical flux essentially comprising alkali- and alkaline earth-metal halides, the steps which comprise: dividing the metal-containing flux into a plurality of small portions, and bringing such portions individually into intimate contact with a relatively large body of molten metal selected from the class consisting of magnesium and magnesium-base alloys, whereby the metal dispersed in the flux becomes coalesced at least in part with the large body of metal and the flux thus freed of metal sinks beneath the surface of the metal body as a distinct layer, and thereafter separating the augmented body of metal from the underlying treated flux.

2. In a method of recovering molten magnesium or magnesium-base alloy from a dispersion thereof in the form of discrete fine globules in a molten spent metallurgical flux essentially comprising alkali- and alkaline earth-metal halides, the steps which comprise: projecting the spent flux in the form of a plurality of fine streams onto the surface of a relatively large pool of molten metal selected from the class consisting of magnesium and magnesium-base alloys, whereby the metal dispersed in the flux becomes coalesced at least in part with the metal of the pool on contact therewith and the flux thus freed of metal sinks beneath the surface of the pool as a distinct layer, and thereafter separating the augmented pool of metal from the underlying treated flux.

3. A method according to claim 2 wherein the molten spent flux is divided into thin streams by pouring it through a 4 to 20 mesh screen.

WILLIAM CLIFFORD NEWHAMS.